Figure 1:
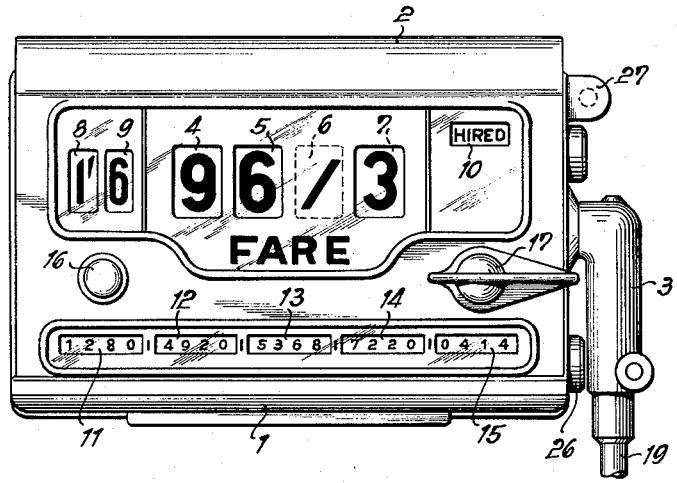

Dec. 12, 1961   W. HAUPT   3,012,712
TAXIMETER DRIVE MEANS
Filed May 24, 1955   12 Sheets-Sheet 1

INVENTOR
WILHELM HAUPT,
By Young, Emery & Thompson
ATTYS.

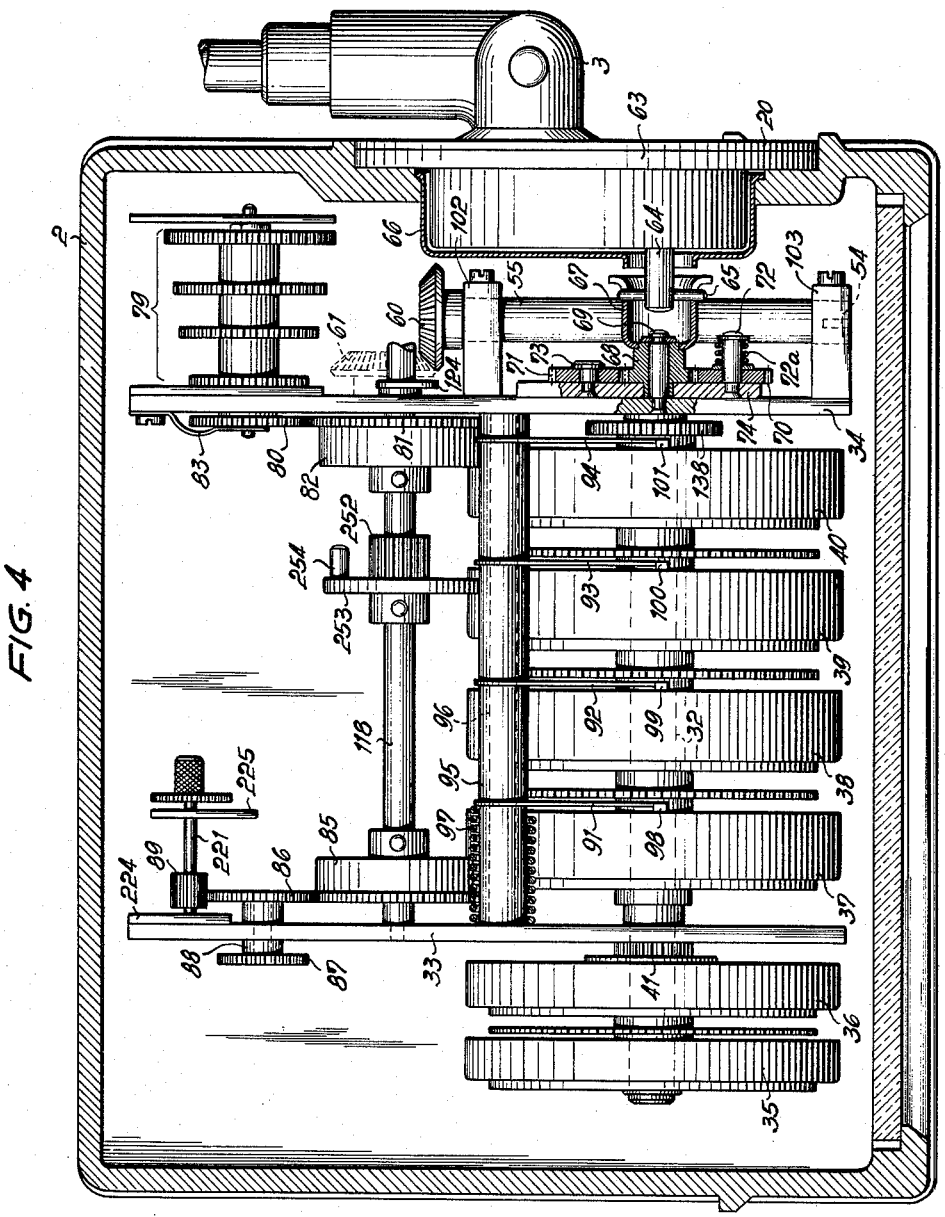

Dec. 12, 1961 W. HAUPT 3,012,712
TAXIMETER DRIVE MEANS
Filed May 24, 1955 12 Sheets-Sheet 4
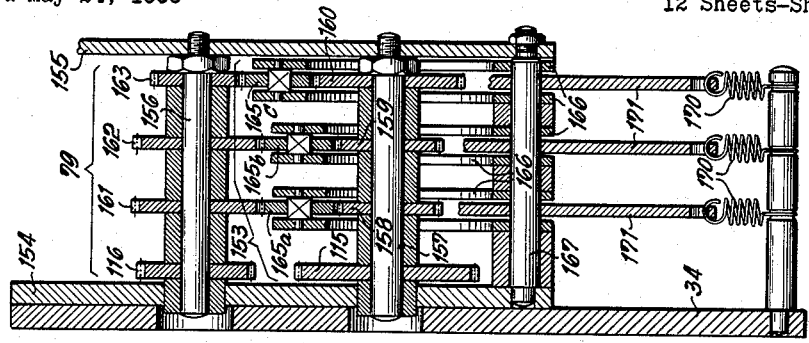
INVENTOR
WILHELM HAUPT

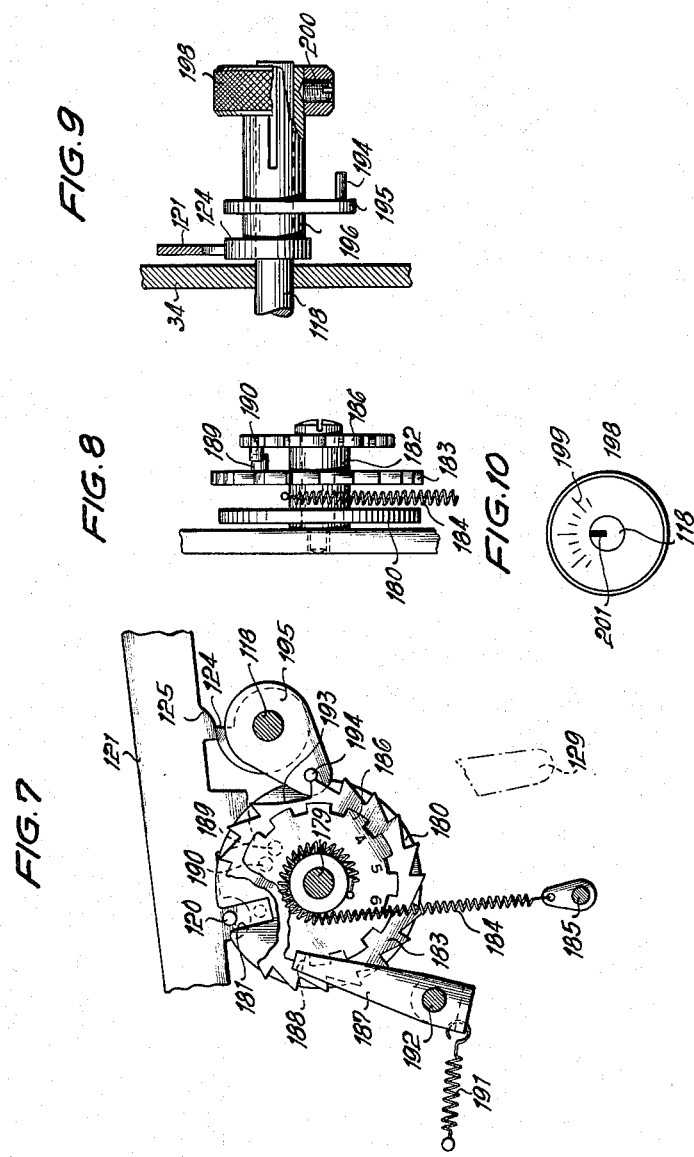

Dec. 12, 1961 W. HAUPT 3,012,712
TAXIMETER DRIVE MEANS
Filed May 24, 1955 12 Sheets-Sheet 6
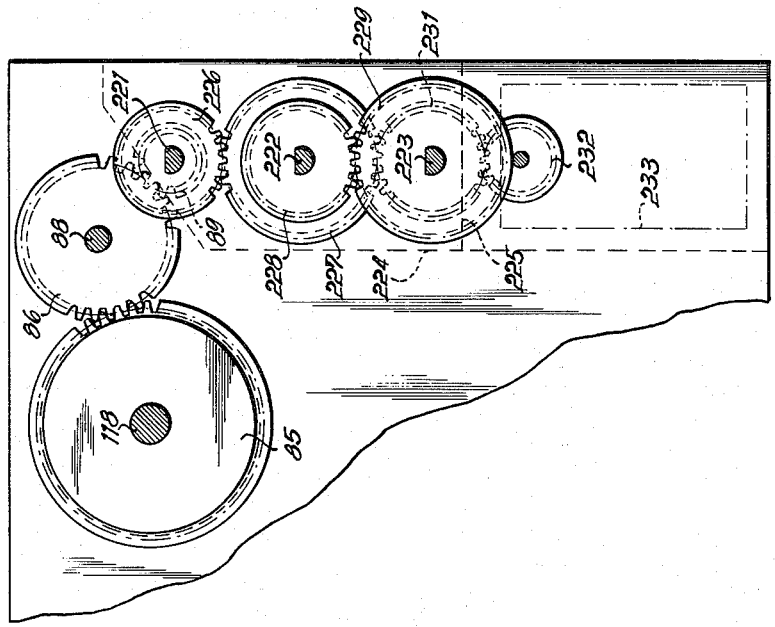
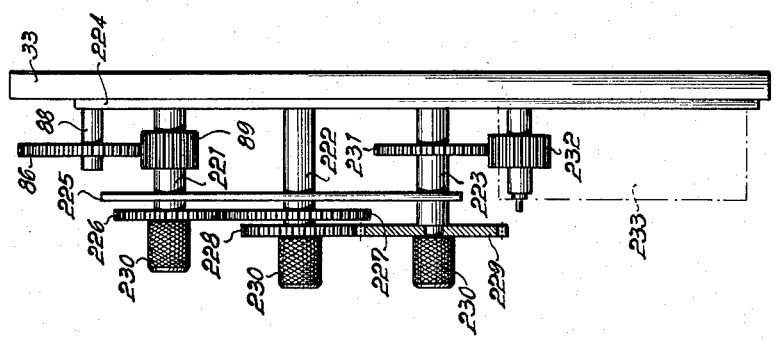
INVENTOR
WILHELM HAUPT
By Young, Emery & Thompson
ATTYS.

Dec. 12, 1961  W. HAUPT  3,012,712
TAXIMETER DRIVE MEANS
Filed May 24, 1955  12 Sheets-Sheet 7

INVENTOR
WILHELM HAUPT
By Young, Emery & Thompson
ATTY:

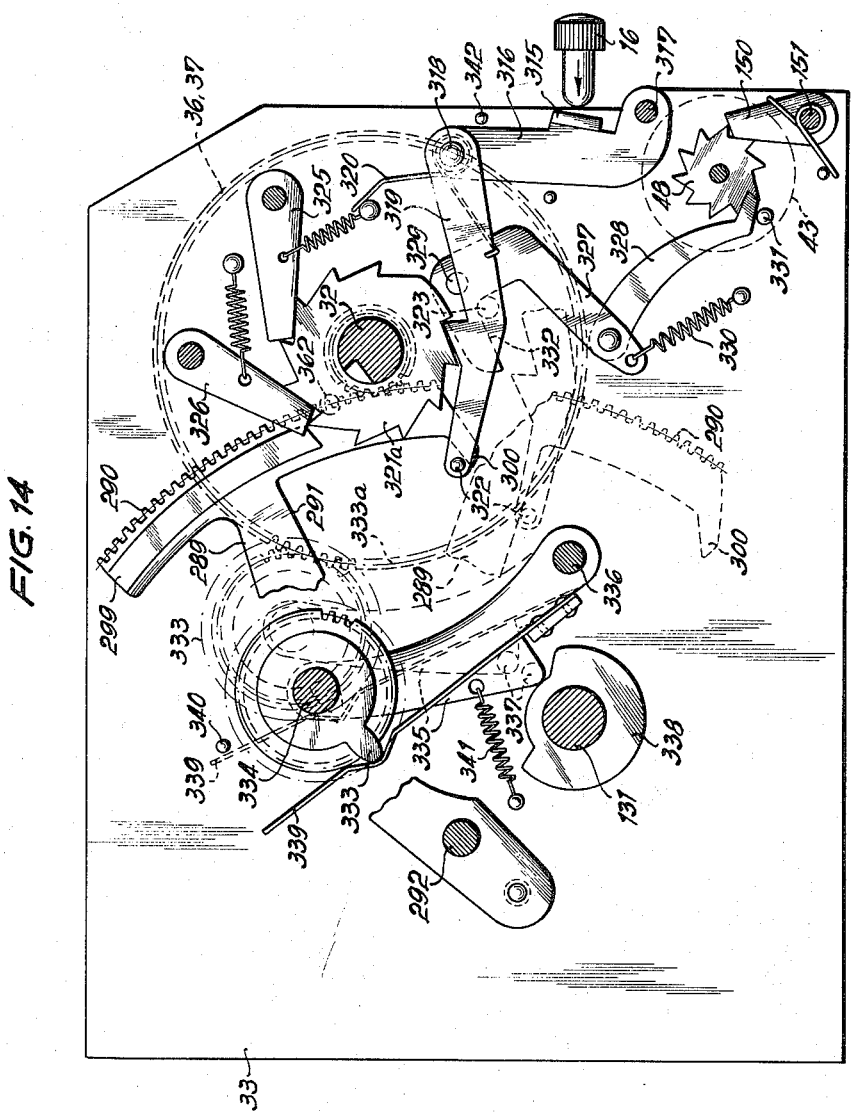

Dec. 12, 1961    W. HAUPT    3,012,712
TAXIMETER DRIVE MEANS
Filed May 24, 1955    12 Sheets-Sheet 9

INVENTOR
WILHELM HAUPT
By Young, Emery & Thompson
ATTYS.

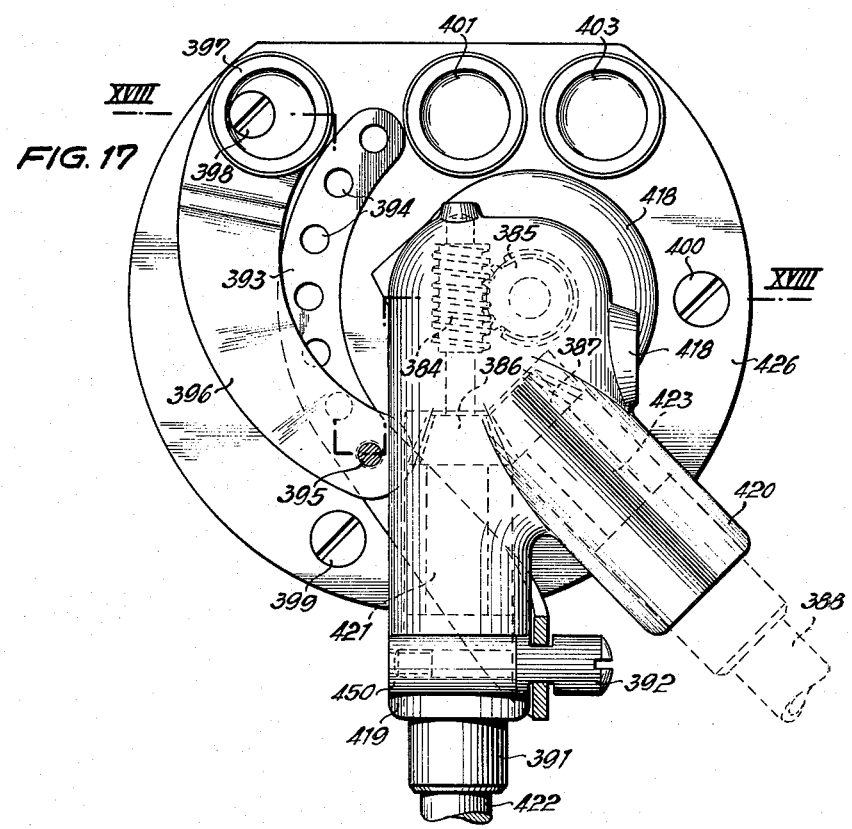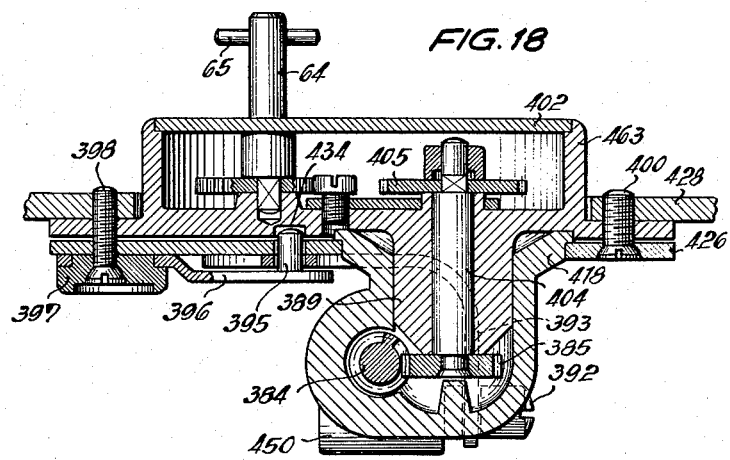

Dec. 12, 1961 W. HAUPT 3,012,712
TAXIMETER DRIVE MEANS
Filed May 24, 1955 12 Sheets-Sheet 11

INVENTOR
WILHELM HAUPT

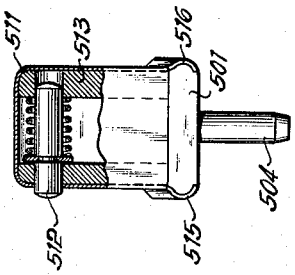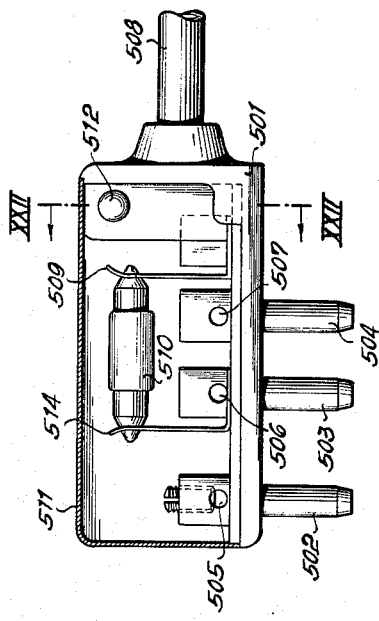

United States Patent Office 3,012,712
Patented Dec. 12, 1961

3,012,712
TAXIMETER DRIVE MEANS
Wilhelm Haupt, Villingen, Schwarzwald, Germany, assignor to Kienzle Apparate G.m.b.H., Villingen, Schwarzwald, Germany
Filed May 24, 1955, Ser. No. 510,662
Claims priority, application Great Britain May 25, 1954
3 Claims. (Cl. 235—30)

The taximeters known hitherto and provided for incorporation in dashboards are, without exception, too large in construction, so that considerable difficulties arise on installing them, since the dashboards leave little space, particularly as a result of built-in radios and the glove compartments. Moreover, with the designs known hitherto considerable difficulties are experienced in matching the taximeter to the speeds of the vehicles and to the tariff stages required by the authorities, since the facilities available permit only very coarse stages. In addition, difficult and time-consuming actions are necessary when the tariffs are changed. Most of these taximeters also suffer from the fact that the parts used in them are simultaneously mounted on base plates and side mounting plates, so that installation and maintenance suffer owing to the poor accessibility. It also frequently happens that the driving torque required for operating these taximeters is relatively high, which means that the corresponding driving parts, such as a flexible shaft and reduction gear, have to be of correspondingly robust construction. Furthermore, in nearly all taximeters the poor illumination of the face plate and, in particular, the totalisers is striking. Recently there have been taximeters with electric clockwork mechanism, but these require electric advance of the fare rollers owing to their construction, or taximeters in which a synchronous motor combined with a vibrator is used as a time mechanism, this resulting in an expensive construction and, in addition, rendering change of the motor necessary in practically all cases when the waiting time is changed.

It is now the object of the invention to provide an improved taximeter design wherein the above-mentioned disadvantages are obviated, which is simpler and more comprehensive in the setting facilities, and which is smaller and relatively more robust in dimensions than the means known hitherto.

The extremely small and, in particular, flat construction of the new taximeter enables it to be installed in all glove compartments known hitherto. In order to enable tariff changes to be carried out as rapidly as possible and without loss of time, and also in order to facilitate assembly, use is made of change wheels which have a uniform module and the spindle holes therein which have a special form for securing against turning and which, when the tariffs are changed, have simply to be pushed on to the corresponding shafts or pins. The said change wheels are the same both for distance and for the waiting time tariff. In addition, these change wheels are also used in the vehicle adjustment gear, so that they are mutually interchangeable, this being impossible in any taximeters known heretofore. By a special construction of the setting devices for waiting time and distance tariffs and for the vehicle adjustment gear, it is possible to adapt them in particularly fine stages, with the aid of the change wheels, to the necessary tariffs or vehicle speeds.

The new taximeter is furthermore provided with an electric time mechanism constructed in accordance with new principles and capable of (1) obviating the difficulties arising through necessary leading and insulating of the current supply cable and (2) avoiding an increase in the size and price of the machine, since the advantages of the electric advance are completely eliminated in small machines having light fare rollers.

As a result of the fact that all the parts are mounted on two bearing plates, it has generally been possible to facilitate assembly, maintenance and accessibility to those parts which frequently have to be changed when the tariffs are changed.

The design of the apparatus is further simplified by splitting up the total function into single functions, these single functions being controlled by means of cams with the aid of a control shaft, which is coupled to the control knob or flag.

An important point in the new design is the reduction of the driving torque, so that it is immediately possible to drive the taximeter with the aid of a normal tachometer driving cable, while from the taximeter only one branch of a flexible cable has to be led to the tachometer.

By using a special split lens and a reflector it is possible considerably to improve the lighting both for the fare rollers and for the totalisers. The face plate is simultaneously illuminated by floodlight with the same lighting lamps.

The drawings listed below illustrate the individual features with the aid of one exemplified embodiment.

Figure 2:
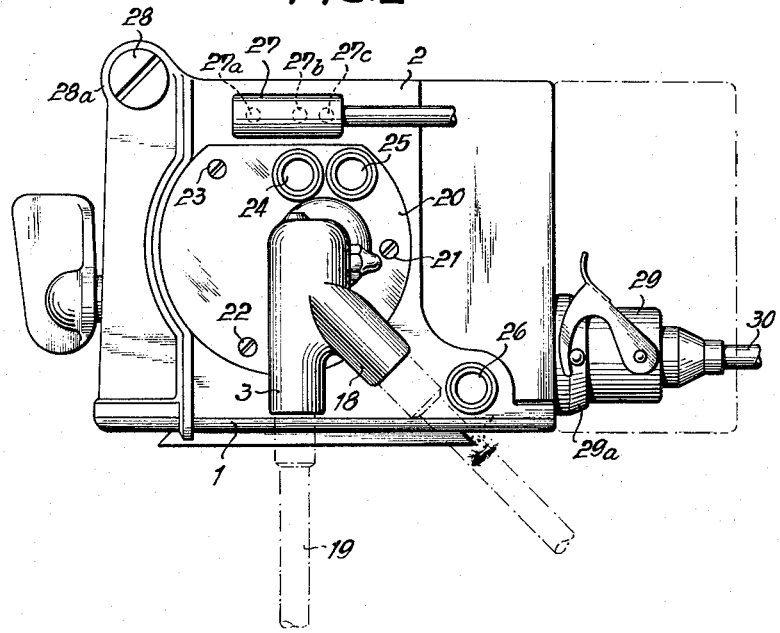
Figure 3:
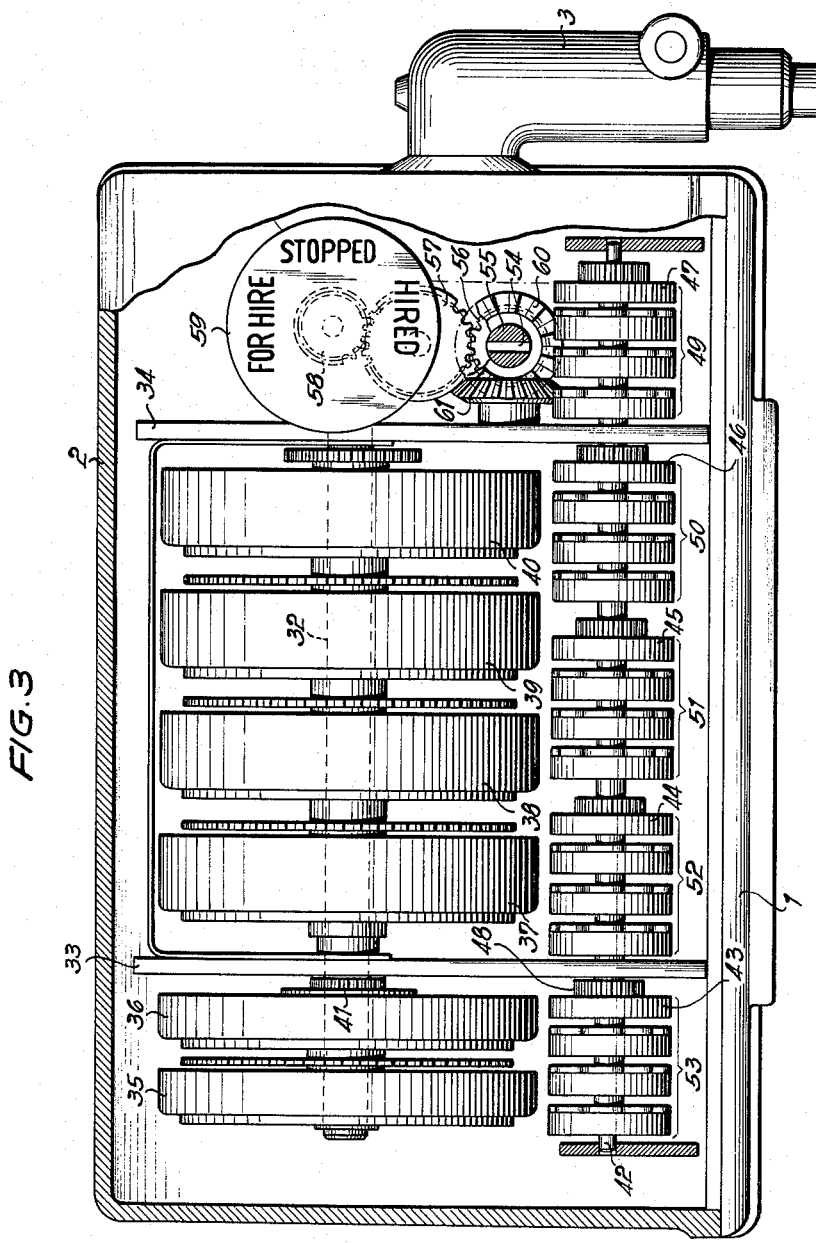
Figure 13:
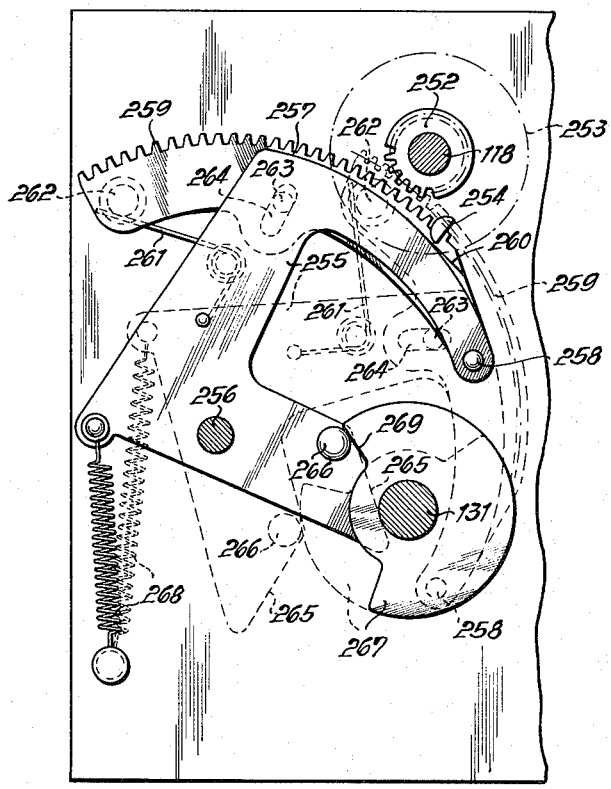
Figure 19:
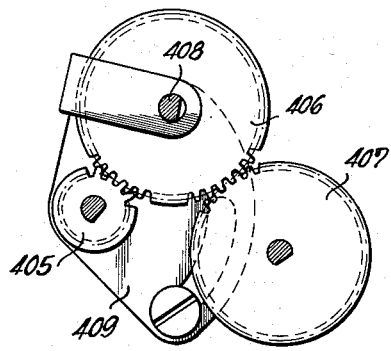
Figure 20:
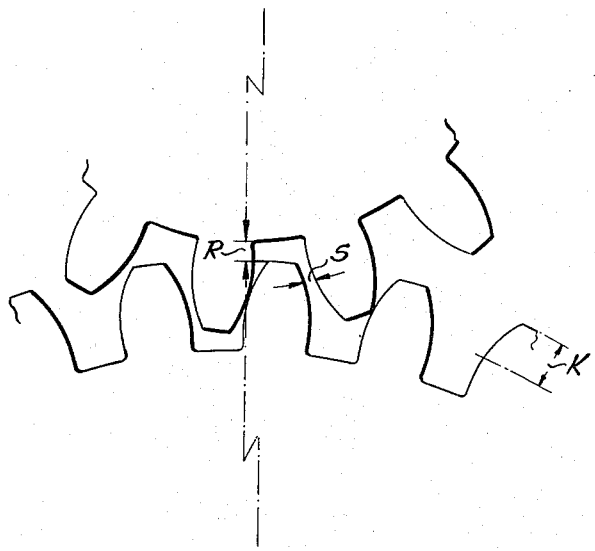

FIGURE 1—Front elevation of the taximeter.
FIGURE 2—Elevation of the right-hand side of the meter.
FIGURE 3—Elevation of the front of the taximeter without face plate.
FIGURE 4—View from above of the inside of the meter.
FIGURE 5—Side elevation from outside of the right-hand plate.
FIGURE 6—Section through the distance gear on the line A—A on FIGURE 5.
FIGURES 7 to 10—Details of arrangement for initial distance setting.
FIGURE 11—Side elevation from inside of the left-hand plate.
FIGURE 12—Section through the time wheel mechanism.
FIGURE 13—Arrangement for returning the elevating wheel shaft.
FIGURE 14—Extras mechanism.
FIGURES 15 and 16—Electric drive for time mechanism, figure being a sectional view partly on the line 2—3 and partly on the line 2—4 on FIGURE 15.
FIGURES 17, 18 and 19—Details of vehicle adaptor mechanism, FIGURE 18 being a sectional view on the line 18—18 on FIGURE 17.
FIGURE 20—Diagram of gear teeth.
FIGURES 21 and 22—Details of fuse box, FIGURE 22 being a sectional view on the line C—C on FIGURE 21.

FIGURE 1

According to the exemplified embodiment illustrated (see FIGURES 1 and 2), the taximeter has a base plate 1, on which the actual mechanism is fastened, and a housing 2, which is provided on the right-hand side with a rotatable connection 3 for a flexible shaft 19 making the connection to the drive from the gear-box of the vehicle (which may be the drive usually employed for driving the tachometer). On the front side the housing 2 has two cut-out portions behind which the actual face plate is fastened. The upper, larger cut-out part contains the information for the passenger, the fare rollers being visible through three or four windows 4, 5, 6, 7. On the left, beside the fare, two windows 8, 9 are provided through which extras rollers are visible. On the right, beside the fare, is an oblong window 10, through which the individual control positions of the taximeter are shown. The lower aperture is provided with the windows 11, 12, 13, 14, 15, which are used for the purpose of observation of the totalisers for checking and accounting by the driver or the taxi-owner. On the middle piece beneath the extras rollers is mounted a push-button 16, which is used to actuate the extras. On the right is the actual control knob 17, which is used to actuate the taximeter instead of the generally used flag.

FIGURE 2

FIGURE 2 shows a side elevation from the right of the taximeter. The rotary cable connection 3 has at the same time a branch 18, which serves to drive the tachometer, so that the drive cable 19 drives both the taximeter and the tachometer. The rotary connection 3 can also be constructed without this tachometer branch 18. It is clamped fast in the correction position with a plate 20 by the three bolts 21, 22, 23. References 24, 25, 26 are lead seals for application by the authorities. Numeral 27 is a three-pin plug, one pin (27a) being provided for the earth connection, one (27b) for the positive lead, and the third (27c) for the connection to the roof sign of the vehicle. The pins of the plug are unsymmetrical, so that it cannot be attached wrongly. At the top front, the housing 2 has a tubular portion 28a in which the lamps for the face plate are accommodated. The lamps can be removed after undoing a screw 28 or one such screw at each end. The base plate 1 has on the back a flange 29a (see FIGURE 2) which is disposed at right angles to the base plate and which is used to accommodate a socket for the plug 29. From the said plug 29 a cable 30 leads to a taximeter sign (not shown) which renders the switch position of the taximeter visible externally in known manner in accordance with the settings of the control knob 17. The said taximeter sign can be fastened directly on the back of the taximeter after the intermediate cable 30 with the plug 29 has been removed, without alteration being necessary to the taximeter or to the taxi sign.

FIGURE 3

FIGURE 3 shows the arrangement of the fare indicator rollers, extras rollers, totalising rollers and tariff dial, the housing being shown in section. As in all the drawings, those parts not directly mentioned are omitted. A continuous shaft 32 is mounted in two side plates 33 and 34 and carries both the extras rollers 35 and 36 and the fare rollers 37, 38, 39 and 40. In a three-digit fare register the roller 39 is omitted and replaced by a spacing tube. The plates 33 and 34 are so placed that they only enclose the fare rollers 37—40, while the extras rollers 35, 36 are overhung on the shaft 32. The advantage of this is that after undoing a shaft securing means the extras rollers 35 and 36 can be taken off immediately. The shaft 32 has a toothed drive 41, which is pushed on the shaft so as to be secure against turning and by means of which the zero setting of the fare rollers is effected in any suitable manner. All the totaliser rollers are mounted so as to be loosely rotatable on a continuous shaft 42 beneath the indicator rollers. The initial rollers 43, 44, 45, 46, 47 are of the same shape and have a ratchet 48, through which the totaliser rollers are driven. The rollers 49 serve to indicate the fare units. The rollers 50 serve to indicate the engaged miles or tenths of a mile. The rollers 51 indicate the continuously driven miles, while the rollers 52 register the individual trips. Finally, the rollers 53 indicate extras totals. The rollers 53 and the extras rollers 35, 36 with the appertaining levers (FIGURE 14) are simply omitted in taximeters without extras. The arrangement and construction shown in FIGURE 3 for the totalisers has the important advantage that none of the initial rollers has to be pinned on the shaft, so that production, assembly and maintenance are greatly facilitated.

The control knob 17 (FIGURES 1 and 2) mounted in the housing 2 engages by means of a coupling (not shown) into the slot 54 in the shaft 55. On the shaft 55 is mounted a wheel 56, which drives a spur wheel 58 through an intermediate wheel 57. Rigidly connected to the spur wheel 58 is a circular disc 59 on which are printed the designations for the individual positions of the taximeter, for example For Hire, Hired, Stopped. On turning the control knob 17 the shaft 55 turns and with it the disc 59, whereby the taximeter position is visible externally in the window 10 (FIGURE 1). Also mounted on the shaft 55 is a bevel wheel 60, which effects the transmission to a second bevel gear 61, to a control shaft not shown in this drawing. On the right-hand side of the housing 2 the rotary connection 3 is again visible.

FIGURE 4

FIGURE 4 shows an elevation of the taximeter from above, the housing 2 again being shown in section. The connection 3 disposed on the right of the housing is fastened to be rotatable about a part 63. This part 63 together with the rotatable connection 3 forms the so-called vehicle adaptor gear and constitutes an individual structural group (see FIGURES 17, 18, and 19). The structural part 63, which contains the change wheels for the vehicle adaptor gear, has an output shaft 64 which effects the transmission of the so-called distance drive into the mechanism through a pin 65. In order to protect the taximeter from contact after removal of the vehicle adaptor gear, a screening pot 66 is mounted in the right-hand side wall of the housing 2. The pin 65 is constructed as a shearing pin, in order to prevent trouble in the case of an overload or jamming inside the meter. The output shaft 64 with the pin 65 rotates proportionally to the distance covered by the vehicle and at the same time drives a coupling sleeve 67. The latter is rigidly riveted to a spur wheel 68, which is in turn rotatably mounted on a bearing post 69. The said spur wheel 68 belongs to a device called a "forward and reverse device" and having the object of evaluating the distance travelled in reverse as well. This device, shown in section in FIGURE 4, is visible from the side in FIGURE 5. To it belong the spur wheels 70, 71, which are mounted on posts 72 and 73, which are in turn rigidly mounted on a lever 74. The latter is mounted so as to be rockable by a small angle about the axis of the post 69. Adjacent the right-hand forked end of the lever 74 are two stop pins 75 and 76. On the post 72 is disposed a compression spring 72a, which presses the spur wheel 70 against the lever 74 and thus produces a frictional force on rotation of the wheel 70.

The action is as follows (see also FIGURE 5):

When the coupling sleeve 67 rotates in the clockwise direction (FIGURE 5) and with it the spur wheel 68, the lever 74 rotates in consequence of the tooth pressure occurring, until the lower prong of the fork strikes the stop pin 76. The planet wheel 71 is then brought into mesh with a spur wheel 77. The latter then turns in the same direction of rotation as the wheel 68. In the case of counter-clockwise motion of the sleeve 67 the lever 74 rotates in the opposite direction until the upper fork prong strikes the stop pin 75, whereupon the left-hand planet wheel 70 engages in an intermediate wheel 78, which is in turn in mesh with the wheel 77. Through the insertion of the intermediate wheel 78, the wheel 77 is driven forward in the same direction, namely clockwise, even in the case of the opposite direction for the drive. The forward and reverse device above described is connected through wheels (not illustrated in FIGURE 4) with the set of wheels 79 of different sizes (FIGURE 4), which is part of the distance gear shown in FIGURE 6. The distance drive is effected from this set of wheels through the wheel 80 to wheel 81 of the unidirectional roller clutch 82. The wheel 80 is loosely mounted on a post (not shown) and is pressed with the aid of a spring 83 against a friction disc, with the object of holding the wheels against the tooth play or backlash resulting through the large number of wheel engagements when changing from distance to waiting-time drive. The outer ring of the roller clutch 82 is rigidly mounted on a shaft 118, which is here designated as a transport wheel shaft and carries at its other end a second roller clutch 85, which is driven in contrast to the distance-driven roller clutch 82 through a spur wheel 86 from a time-dependent mechanism. The wheel 86 is driven from a wheel 87 and is mounted by means of a shaft 88 in the side plate 33. The wheel 87 is turned by an electro-magnetic driving arrangement which is shown in FIGURE 15, while the pinion 89 (see FIGURE 7) effects the transmission to an escapement by means of change wheels not shown in FIGURE 4. On the right-hand end of the transport wheel shaft 118 is overhung a single-toothed transport wheel 124 in the form of a snail cam having a single step in its periphery. The shaft 118 rotates proportionally to the distance covered and corresponds to the tariff stage switched in as long as this speed of rotation is higher than the constant speed of revolution brought by the time-drive to the roller escapement 85. If the speed of rotation transmitted from the distance drive to the roller escapement 81 has become smaller than the constant speed of rotation of the time-dependent drive, the fare is then recorded by the time-dependent drive through the transport wheel 124 and levers (not illustrated) on the fare rollers 37—40, so that below a given limiting speed determined by the incorporated tariffs, the distance covered is no longer calculated.

FIGURE 4 also shows an arrangement which serves to catch the fare rollers in the zero position on zero setting to prevent overrunning of the rollers. This is achieved by the stop levers 91, 92, 93, 94, which are mounted in grooves in a tube 95, which is in turn rotatably mounted on a spindle 96 and is subject to the action of torsion spring 97. The rollers 37—40 have projections 98, 99, 100, 101, which run against the stop levers 91 to 94 in the zero position and hence prevent slipping forward. FIGURE 4 also shows the mounting of the control shaft 55 in the bearing brackets 102, 103, seen from the top.

FIGURE 5

FIGURE 5 shows a view from outside of the right-hand side plate of the meter. As already mentioned, the forward and reverse device having the lever 74 and the wheels 68, 70, 71, 78 are visible from the side in this view. As already stated, the said forward and reverse device produces a rotation of the wheel 77 always in the same direction, namely clockwise. To the wheel 77 is rigidly connected a wheel 104, which is in turn in mesh with a spur wheel 105 and which together with the wheel 106 are mounted on a countershaft, the total transmission ratio being so selected that one revolution of the spur wheel 107, which is in mesh with the wheel 106, corresponds to one-tenth of a mile. This is necessary because on the shaft 108 are eccentrically mounted one or two thrust rods 109. These are carried on a pin 109a attached eccentrically to the countershaft 108. The rods 109 advance the initial rollers of the engaged or total mileage. The speed of rotation of the wheel 107 is transmitted through an intermediate wheel 110 and two countershaft wheels 111, 112 and 113, 114, to a spur wheel 115. The latter is a structural part of a separate structural group called the distance-gear and described in detail below. The two countershaft wheels 111, 112 and 113, 114 are disposed to be detachable and as a preliminary transmission for the vehicle adjusting gear enable the adjustable range for the distance units to be enlarged as a result of the fact that by simply transposing them they run with the transmission ratios 1:2, 2:1 and 1:1.

The action will be described more fully hereinafter.

The distance adjustment gear has an output wheel 116 which is in mesh with a wheel 117, which transmits its rotation which is mounted on a spindle 117a that also carries a wheel meshing with wheel 80 (FIGURE 4) thereby driving the latter and the roller clutch 82 and the transport wheel shaft 118.

FIGURE 5 shows diagrammatically with broken lines an individual structural group 119, the so-called initial distance setting means (i.e. the distance to be travelled before the first fare increase occurs), which is shown separately in FIGURES 7 to 10. A pin 120, which is in active contact with the initial distance setting means 119, is rigidly mounted on a lever 121, which with the aid of a pawl 122 operates a ratchet wheel 123 which advances the fare rollers by one fare unit at a time. This stroke of the lever 121 is obtained by the single-toothed control cam or transport wheel 124 which lifts and drops the advance lever 121 once with the aid of the projection 125 on each revolution of the shaft 118. The shaft 118 rotates once per trip-unit according to the tariff set. The advance lever 121 is rockably mounted on a bearing post 126 and guided at its left-hand end with the aid of a guide post 127 and an oblong slot 128. The lever 121 also has an arm 129 which is disposed at right angles to it and which rests on a cam 130 (FIGURE 5). The latter is mounted to be secure against turning on a shaft 131, which is rotated with the aid of the control knob 17 through the bevel wheels 60, 61 (see FIGURE 4). In the For Hire position, the arm 129 lies on the part of largest radius of the cam 130 and is raised. The pawl 122 is then out of engagement with the ratchet wheel 123 and the projection 125 is out of the path of the control cam 124. At the same time the pin 120 moves out of the initial distance adjustment device 119 (see FIGURES 7 and 8). In the "Hired" or "Stopped" of the taximeter, the arm 129 is out of engagement with the cam 130, whereby the rotary movement of the control cam 124 can be converted into the already described driving movement of the lever 121. When the advance lever 121 falls, the movement is limited by the control cam 124, while overrunning of the ratchet wheel 123 or of the fare rollers is prevented by an eccentric adjustable stop 132. The stop is eccentric in order that production tolerances may be compensated for. The ratchet wheel 123 is clamped fast to a flange 135 with the aid of two screws 133, 134. The said flange 135 is pinned to a shaft 136. The bores for the screws 133, 134 are somewhat larger than usual, as a result of which the ratchet wheel 123 can be turned by a small angle in relation to the flange 135. Rigidly riveted to the shaft 136 is a wheel 137, which is in mesh with a spur wheel 138, which is fixed in relation to the initial roller 40 (see FIGURE 4).

The ratchet wheel 123 has ten teeth, while the initial roller 40 may have 8, 9, 10 or 12 teeth according to the currencies in the lettering. The wheels 137, 138 can be replaced by two similar wheels of different ratio for using the toothed ratchet wheel 123 for various non-decimal initial rollers 40. The small displacement of the ratchet wheel 123 in relation to the flange 135 permits accurate setting of the initial figure roller in its zero position. During the lifting of the advance pawl 122, the ratchet wheel 123 and with it the initial roller 40 are secured by the non-return pawl 139, which is subject to the action of the spring 140. In order to ensure an accurate engaged position the advance pawl 139 is bevelled at its end 141—precisely the opposite to the otherwise usual constructions. A connecting piece 143 is also rotatably mounted on a pin 142 of the advance lever 121. The lifting movement of the connecting piece 143 is converted into a rocking movement of a second two-armed lever 144, which is mounted on the totaliser pinion shaft 145. On one arm of the two-armed lever 144 is mounted a pawl 146, which shifts a ratchet wheel 147 forward by one tooth on each lifting movement of the shift lever 121. The said ratchet wheel 147 is rigidly connected to a figure roller 148, which constitutes the initial roller 47 of the totaliser 49 for the fare units (FIGURE 3). The pawl 146 is provided with a stop 149 which prevents the ratchet wheel 147 from slipping out when advanced over one tooth. The ratchet wheel 147 again has a non-return pawl 150 which like all the check meter non-return pawls is rotatably mounted on a shaft 151 and is again bevelled in the same way as the non-return pawl 139 in order to ensure an accurately engaged position. The advance of the ratchet wheel 123 and hence of the fare rollers and also of the ratchet wheel 147 and hence of the totaliser rollers is obtained by a helical spring 152, which is hooked on to the bearing pin 142 and to the stop pin 76.

FIGURE 6

FIGURE 6 shows a section through the road-distance drive as already mentioned, visible from the side in FIGURE 5. The road-distance drive, forming a constructional unit in itself, has two stepped gear-trains 79 and 153, mounted in bearing plates 154, 155. On the shafts 156, 157 of the gear trains 79, 153 are mounted the gear-change wheels 158, 159, 160 and 161, 162, 163. The wheels 115, 116 are fixed on the shafts 156, 157.

A D-shaped boring is cut in these gear-change wheels, and in the wheels 115, 116, and the shafts 156, 157 are tooled to a corresponding shape. The gear-change wheels belong to a gear train used for all tariff settings and for adaptation to the vehicle. They have a unified ratio and the same kind of wheels can be inserted in the vehicle-adaptation drive, road-distance drive or waiting-period drive (to be described with reference to FIGURES 11 and 12) and are interchangeable. We are therefore dealing with standard gear units in this case. These gear units have significant advantages compared with previously known constructions, especially when tariff rates are changed, also in respect of their structure and mounting. A change in the tariff of fares is effected by a simple transposition of these gear-change wheels: the connection between the two gear-trains 79, 153 is effected through intermediate wheels 165a, 165b, 165c. These intermediate wheels 165 are mounted on three arc-shaped swinging arms 166 respectively and are changed over with the change in the stepped gears 158, 159, 160, so that 165a will mesh with both 158 and 161; or 165b will mesh with both 159, 162; or 165c will mesh with both of 160, 163; according to the tariff selected by rotation of shaft 131, through the medium of the knob 17. So as to avoid any variation in the axle distance between the intermediate wheels and the stepped gear train 153, the intermediate wheels will be changed if the stepped gear wheels are changed, a constant number of cogs between an intermediate wheel and the wheel it engages being maintained. In this way it is possible to maintain a constant inter-axial distance. The intermediate wheels are of the same pattern as the gear-train wheels (i.e. same module and shape of holes, and thickness of wheel). The arc-shaped arms 166 are not mounted on bearings on the axle of the stepped gear shaft 157 but are mounted away from it on a bearing pillar 167, which is fitted right opposite to the intermediate wheel shaft. This type of mounting for the intermediate wheels has two advantages:

(1) It enables a simple mounting of the swinging arm without frictional loading of the stepped gear shaft 157, and (2) A simple change-over of the gear-train wheels in the stepped gear shaft is possible.

Each of the arc-shaped levers 166 has two bores 168, 169 for the bearings of the intermediate wheels 165, so as to give the intermediate wheels a bigger range, and thus the inner or the outer bore can serve as the bearing, as required. The bearing pin 167 of the levers 166 is furthermore so chosen that the tooth pressure in the stepped gear wheels 158, 159 or 160 urges the swinging arm 166 in the direction (clockwise in FIGURE 5) to hold the intermediate wheels in engagement with the stepped gear wheels 161, 162, 163, while the tension spring 170 (one for each lever 166) is stretched very weakly and only has to overcome the weight of the swinging arm. The intermediate wheels can therefore move out of engagement should any unusual jamming occur in the mechanism. Each lever 166 carries a cam lever 171 which lies with its nose 172 on a cam plate 173; thus three cam plates 173 are provided and these are mounted overhung on the shaft 131. In the position shown in the drawing an adjustment between the intermediate wheels 165a, 165b and 165C and the gear-change wheels, 161, 162, 163 is effected by means of set-screws 174 in longitudinal slots 175, after changing the position of the gear-train wheels and the intermediate wheels. By turning the shaft 131 the nose 172 of the cam lever 171 is pushed out and thus the intermediate wheel 165 disengages from a gear-unit wheel in the stepped unit 79, while a second arm 166, connected with a second cam plate 173, is brought into engagement simultaneously with the next gear wheel of the gear train 79. At the same time, when switching over from one tariff to the next, for instance from wheel 161 to wheel 162, both gear train wheels 161, 162, engage for a short time in spite of different ratios with the corresponding intermediate wheels. The intermediate wheel 165 is quicker than the gear change wheel 161 at this instant, so that it is once again gradually pushed out of engagement. In this way the special advantage is achieved that in switching over from one tariff to the next, it is impossible at any moment for all the gear train wheels to be out of engagement at once, thus effectively preventing any attempt to switch the taximeter out of use, by trying to find an intermediate position between the tariffs.

Each lever 166 is actually a pair of similar levers carrying an intermediate wheel. The cam lever 171 in conjunction with each pair of arc-shaped levers 166 and the intermediate wheel belonging to them form a unit for each tariff, so that in the case of an apparatus for three tariff rates there are three such units, and with two or single tariff instruments correspondingly fewer units are needed, and are replaced by spacing tubes. The same may be said of the stepped gear wheels 158—163 and the cam discs 173. The cam discs 173 are pressed on to flats 173a on the cam shaft 131, milled on both sides, as a result of which the hollow in the cam plate 173 is shifted in respect of the profiled hole for the various tariffs.

FIGURES 7 to 10

As already mentioned in FIGURE 6, the pin 120 of the lever 121 works in conjunction with a so-called initial distance setting, as represented in FIGURES 7, 8, 9 and 10. This setting is for the purpose of adjusting the initial distance to be travelled before the first fare increase is applied to the fare rollers. In general the initial distance is a simple or compound multiple of the unit of charging distance, i.e. if the ratchet 123 is moved at each one-fifth of a mile the initial distance will normally be a fifth of a mile or a multiple or a fraction of one-fifth of a mile. These units of distance are mostly changed when the fare tariff is changed, so that it is a matter of importance for the change to be effected by the simplest possible means. It consists of the following parts: The disc 180 is mounted on a bearings pin 197, which is in the form of a screw with a neck so as to make mounting easy. Firmly connected to the slotted disc 180 by means of a bush 182 there is a ratchet wheel 183. Round the circumference of the bush 182 there is a spiral spring 184, of which the lower end is connected to a pin 185, while the other end is fixed to the bush 182. This spring 184 tends to pull the slotted disc 180 in an anti-clockwise direction (FIGURE 7) so that the right side of the slot 181 lies with a gentle pressure on the pin 120 of the lever 121. The peripherally slotted or notched disc 186 turns loosely on the shaft 197, but is held fast by a lever 187 having a turned out nose 188. The slots on the disc 186 are designated with figures which indicate the aforesaid multiples or fraction. On the ratchet wheel 183 there is an abutment or pin 189, which runs against a counter abutment or pin 190 on a peripherally notched disc 186 through the effect of the spring 184 when the pin 120 moves out of the slot 181 (upon moving the knob 17 back to starting position). The lever 187 is urged into engagement with the notched disc 186 by a spring 191 round a pivot pin 192. A tooth is removed from the wheel 183 forming a gap 193. A projecting element or pin 194 can move round freely through this gap. The pin is mounted on an arm 195 which is in turn mounted on the bush 196.

The method of operation is as follows:

On turning the switch knob 17 into the "For Hire" position, the lever 121 and thus the pin 120 are raised, by means of the arm 129, so that the pin leaves the slot 181 in the slotted member 180. Through the effect of the spring 184 the slotted member 180 is turned round, and with it the ratchet wheel 183 far enough for the pin 189 to come into contact with the abutment pin 190 of the disc 186. At the same time the nose 125 leaves the cam 124. The shaft 118 is turned round by means of a special device (not shown) to a pre-determined initial position. This is necessary, as at the end of a journey the cam 124 can be in any position, whereas at the beginning of the journey this cam must be in a special predetermined position. When the knob 17 is turned to the "Hired" position, the lever 121 sinks until the pin 120 lies on the circumference of the slotted plate 180 through the effect of the spring 152.

In accordance with the distance travelled, the shaft 118 turns, and with it the flange 195 with pin 194, so that by each turn of this pin 194 the ratchet wheel 183 turns one tooth further, until the pin 120 can slide into the slot 181. At the same time, the pin 194 reaches the gap 193 in the ratchet wheel 183 and can thus thereafter turn without operating the ratchet wheel. As the pin 120 falls into the slot 181, the projection 125 falls on to the cam 124, which turns round once per unit of distance set for the predetermined tariff, and at the same time raises the lever 121 on each occasion and lets it fall again. As it falls in the manner already described the pawl 122 is operated, the ratchet wheel 123 is turned, and fare indicating means moved on by one figure. With the aid of the slotted member 186 and the cam lever 187 an exact multiple of the distance unit can be adjusted as desired. The individual cams on the disc 186 are marked with numbers, so that merely the lever 187 is lifted and the notched disc turned to the corresponding number and the lever again engaged. If there are intermediate values between the exact multiples as initial distances, then these intermediate values are adjusted by turning the collar 196 on the shaft 118. The grub screw 200 is loosened slightly and, with the aid of the knob 198, turned until the desired mark of the face scale 199 coincides with the mark on the shaft 118. This device can also be used to regulate the apparatus exactly to an exact multiple of the distance unit. The same applies to the sleeve 196 with the cam 124 and knob 198, which are carried overhung on the shaft 118. Corresponding to the choice of number of teeth on the wheel 183, it is possible to obtain any desired large multiple of the distance unit.

On the lift wheel shaft 118 there is seated the roller clutch 85, driven from the time gear, as already explained in FIGURE 4. This roller clutch 85 is driven through the spurwheel 86 with the aid of an electric winding device acting through the wheel 87 (see FIGURE 4). In order to obtain a uniform rate and to be able to adjust to any desired variable waiting time units, there is a built-in gear train having a clock escapement. This is composed of the gear 89 on the shaft 221, a shaft 222 and a shaft 223, which have bearings in the plates 224, 225 (FIGURES 11 and 12). The shaft 221, 222 and 223 have a part milled to a D-shape, on which the already frequently mentioned gear wheels—in this case 226, 227, 228 and 229—are stuck on overhung and fixed by clamp nuts 230 (see FIGURE 12). The shafts 221, 222 and 223 have equal, fixed axial distances. By changing two pairs of wheels an exceptionally large number of waiting time units can be adjusted. For this it is necessary to keep for one pair of wheels a definite total number of teeth, and any adjustment of tooth segments is unnecessary. The change wheels are consequently carried overhung, in order to make possible a simple change over for changes of tariff. On the shaft 223 there is also a wheel 231 which is in engagement with a balance wheel drive 232 of an escapement 233 which is not shown.

*FIGURE 13*

In FIGURE 13 there is seen from the side a device which is called the cancellation or zeroising device and which serves to bring the time and distance wheel shaft (or transport shaft) 118 with the switch cam 124 into the starting position. On the shaft 118 is fixed a drive pinion 252. Riveted to the pinion 252 is a disc 253 having a projection or pin 254. A rocking lever 255 is carried pivotally on a bearing post 256. This lever 255 has a stop segment 257, which has its centre point in the axis of the post 256. This stop segment 257 has on its right hand end a bearing post 258 on which is carried a toothed element in the form of a segment 259 so that the latter can swing round a small angle. On this toothed segment 259 there is set a second stop segment 260 providing an abutment surface engageable by the projection 254. The toothed segment 259 is pressed upwards under the action of a bent spring 261 and of a post 262 so far that its teeth come into engagement with the pinion 252. This position is shown by broken lines in FIGURE 13. The toothed segment 259 with the stop 260 is guided by means of a guiding post 263 and a slot 264. The lever 255 is formed with two arms and has at its right hand lower arm a stop surface 265, which in the position shown in FIGURE 13 strikes against a shaft 131 and therewith limits the rotary movement in a clockwise direction. The shaft 131 is rotatable by the driver by means of the control knob 17 or flag. On the same arm of the lever 255 there is a pin 266 which cooperates with a cam 267 on the shaft 131. The lever 255 is under the action of a spring 268 which urges the lever 255 in the direction to hold the pin 266 against the cam 267.

The operation is as follows:

In FIGURE 13 is shown by broken lines the position taken by the zeroising device in a first position corresponding to "Hired" and "Stopped" conditions, while the position in a second position, corresponding to the "For Hire" condition is shown by broken lines. In the first or "Hired" position thus the toothed segment 259 is under the action of the bent spring 261 with a light pressure on the teeth of the pinion 252 of the shaft 118. As in this position the shaft 118 and therewith the pinion 252 turn in a clockwise direction in accordance with the time or the distance covered, the toothed segment is steadily pressed out of the teeth of the drive, whereby it swings round the post 258. The bent spring 261 is so weak that there can be no appreciable wear on the teeth. After the end of a journey the control knob 17, and with it the shaft 131 and the cam 267 are turned in an anticlockwise direction, so that the pin 266, which till then lay on the outer circumference of the cam 267, can come under the action of the spring 268. Thereby the toothed segment 259, by turning of the lever 255, is turned in a counter clockwise direction and the gear drive 252 and therewith the lift wheel shaft 118 are turned in the free-running direction of the roller uni-directional clutch through which the shaft 118 drives the fare indicating means. The point of suspension of the toothed segment 259 on the post 258 is chosen so that the direction of tooth pressure includes the post 258 and therefore the engagement between toothed segment and gear drive 252 is itself ensured by this pressure. The bent spring needs only to be so strong that the toothed segment and drive are in continuous contact. By turning the gear drive 252 the disc 253 and therewith the pin 254 turns in a clockwise direction. Thereby this pin 254 strikes on the stop 260 which is fixed to the toothed segment 259, whereby the toothed segment comes out of engagement with the pinion 252 whereby any further movement of the segment does not operate the pinion but the latter (and the shaft 118) having reached their zero or starting position remain in that position, the pin 254 riding on the surfaces 257, 260.

FIGURE 14

FIGURE 14 shows a side view of the arrangement for controlling the extras, viewed from outside on to the left hand plate 33 of the taximeter (FIGURES 3 and 4). Since in some taximeters the extras are not needed, and furthermore in order to ensure simpler assembly, the entire extras device is mounted externally on the plate. In order to permit the driver to control the extras, use is made of a push-button 16. The push-button 16 presses against a bent-over tag 315 on a lever 316, which is mounted on a small post 317. The lever 316 carries at its upper end a bearing post 318, on which an extras driving pawl 319 is mounted. The pawl 319 is acted on by a spring 320, which serves two purposes. By one of its limbs it presses the pawl 319 into engagement with a first ratchet wheel 321, while the other limb of the spring 320 brings the arrangement to the right, as far as a stop 342, against the direction of pressure of the push-button 16. The pawl 319 has furthermore at its left hand end a projection or pin 322, and in the middle a second projection or pin 323. The ratchet wheel 321 has onetwelfth tooth spacing, but for use when a single extras roller is provided one tooth space is filled in as shown at 321a. When two extras rollers are provided the ratchet wheel is toothed throughout. The ratchet wheel 321 is connected with the roller of the first roller of the two-figure extras rollers 36 or to the single extras roller, and has a stop pin 362. The ratchet wheel 321 has two catch and retaining pawls 325, 326 with associated springs.

For the transmission of the extras to the starting roller of the extras totalling rollers 43, a further lever 327 and driving pawl 328 are also provided. The lever 327 is actuated by the projection or pin 323 on the first driving pawl 319. The lever 327 is mounted on a post 329 and is constructed as an angle lever, while the second driving pawl 328 is rotatably mounted on the bottom end of the lever 327. A stop surface 332 on the lever 327 lies parallel to a tooth back of the ratchet wheel 321, in order to prevent the angle lever 327 from performing a rotating movement while the tooth of the pawl 319 slides up on the back of a tooth of the ratchet wheel 321. The angle lever is turned only after the falling down of the tooth flank of the teeth of the ratchet wheel 321. A second ratchet wheel 48 is connected with the extras total roller 43. The onward movements of the ratchet wheel 48 are effected by a spring 330. The further movement of the roller 43 is prevented in the customary manner by a pin 331. The backward turning of the extras total roller 43 and the exact stopping position of the same are in turn secured by a catch and retaining pawl 150.

The mode of operation is as follows:

On the repression of the knob 16, the pawl 319 slides over the corresponding tooth of the ratchet wheel 321, and after the release of the push-button 16 turns the ratchet wheel 321 one tooth under the action of the spring 320, so that the roller is turned one figure forwards in the counter-clockwise direction. In order to prevent further movement of the roller 36, the pin 322 is provided, which strikes against the nose 360 of a rocking zeroising member 289. The filled-in tooth gap 321 of the ratchet wheel has the purpose of preventing the further shifting of the extras roller after ten shifts. Since the solid tooth comes under the retaining catch on being moved on, so that the catch cannot fall in, two retaining pawls 325 and 326 are necessary. In addition, the fulcrum of the retaining pawl 326 is offset rather further, so that this pawl drops in sooner than the retaining catch 325, i.e. when one pawl engages its adjacent tooth, the other pawl is spaced from its adjacent tooth. This has the purpose of preventing the roller from turning back into the original position in the event of the knob 16 not being sufficiently pushed in. Only after it has been properly pushed in can the ratchet be moved on, since the pawl 319 cannot drop in. The pin 323 of the pawl 319, when the pawl 319 drops into the bottom of a ratchet tooth, turns the angle lever 327 and thus turns the pawl 328 upwards, while on the movement of the pawl 319 to the right the ratchet wheel 48 of the extras total roller 43 is turned one tooth forwards. The effect is thereby achieved that the extras total roller can only be moved on when the extras roller 36 is likewise shifted.

On commencement of zeroising, the extras rollers are turned to zero in the counter-clockwise direction simultaneously with and in the same way as the fare rollers, with the aid of the toothed segment 290 of the zeroising member 289 which is mounted for pivotal rocking movement on a shaft 292. In order now to prevent the starting extras roller from moving beyond the zero position, it has a pin 362 which in the zero position strikes against a stop segment 299. In order further to prevent the extras roller from being operated in this position of the toothed segment, i.e. in the "For Hire" position, the zeroising lever 289 has a stop 360 which engages the pin 322 and presses the pawl 319 downwards out of engagement with the ratchet wheel 321 as shown in broken lines. If the push-button is pressed in this position, it is true that the pawl will move, but the ratchet wheel will not be moved with it. The pin 323 of the pawl has likewise left the stop surface 332 of the angle lever 327, so that the totaliser roller 43 is also not shifted.

When two extras rollers are used a transfer pinion 333 transmits the onward movement from the first to the second roller. This pinion must be brought out of engagement with a ratchet wheel (also represented by the circle 36) of the starting roller, in order that the two rollers can be set to zero. The transfer pinion 333 is mounted on a small post 334, which in turn is riveted on a lever 335. The lever 335 is rockable over a small angle about a small post 336, and has a pin 337 which bears against a cam 338 of the control shaft 131 which is rotatable by hand. On the turning of the shaft 131 into the "Hired" position, the lever 335 is rocked to the right with the aid of this cam 338, whereby the transfer pinion 333 is brought into engagement with the ratchet wheel 36 of the second roller. The lever 335 has a leaf spring 339, which holds the pinion 333 fast on moving out of engagement, in order to prevent the pinion from turning. On moving into engagement, the spring 339 can be lifted by a stop pin 340 off the pinion. The lever 335 is acted on by a spring 341.

FIGURES 15 and 16

FIGURE 15 shows the electro-magnetic device for the time-dependent drive of the transport shaft 118 or for the drive of the escapement 233. The electro-magnetic device comprises an electro-magnetic coil 344 having two windings 345 and 346. Two windings are used in order that replacement of the windings may be obviated by connecting the windings in parallel or series when 6 or 12 volt batteries are used. A coil body 347 is placed over a brass sleeve 348. This brass sleeve is riveted to a yoke 349. The latter is of ferro-magnetic material and serves at the same time for mounting the magnet. An armature 350 is mounted in the bore of the sleeve and a disc 351 of elastic material is also disposed on the right hand end of the sleeve. The latter has a bore 352 in order that on sudden movement of the armature 350 the air present may be able to escape. The armature 350 is also guided on a shaft 353 so that it cannot jam on moving. The shaft 353 is of non-magnetic material, e.g. German silver. Its left hand end is fastened so as to be readily movable in a U-shaped stirrup 354. The armature 350 is pulled outwards by the action of the spring 355. An earthing contact plate 356 is riveted on to the end of the armature. The contact plate has two contacts 357 and a guide plate 358 which can move in a slot 359 in a bearing plate 33. On the return connection stirrup 349 are further mounted a carbon brush holder 360 with a carbon brush 361 which is pressed on to the movable coil armature 350 to form a good earth. The parts described up to now form an individual structural group. The cooperating contacts for the contact plate 356 are formed by the contacts 362, each of which is riveted on to a resilient bronze plate 363. The latter are mounted on a swinging lever 364 which is riveted on a bush 365 and is disposed rotatably on a post 366. For the purpose of increasing the mass of the swinging lever metal plates can also be riveted on with the bronze plate. The lever 364 is insulated from the post 366 with the aid of a sleeve 367 and an insulating washer 368. Also mounted on the post 366 is a device comprising a fine-toothed ratchet wheel 369, a toothed wheel 370, a bush 371 and an intermediate spring 372. A pawl 373 is rotatably mounted on the lever 364 on a post 374 and is subject to the action of an elbow spring 375. In addition to this pawl 373 which is in mesh with the fine-toothed ratchet wheel 369, a second pawl 376 of the same shape is in mesh and is rotatably mounted on a post 377. On the end of the bearing post 366 a terminal plate 378 is secured with the aid of a screw 378a. The terminal plate carries two connection terminals 379, 380 for the connection thereto alternately of the two windings of the magnet coil 344. From the terminal 380 a connecting wire 390 leads to the contact angle lever 363 and a wire leads to a terminal 349. The windings of the coil 344 are soldered wtih a bronze spiral spring 381 and a low-melting solder 382 (e.g. Wood's metal), to the terminal 349 in order to prevent burning out of the coil 344 if a fault occurs, for example if the intermediate spring 372 breaks or the contacts 362, 357 stick together, since if the winding heats up to a temperature of about 70–100° C. the soldered point 382 melts and the coil current is broken with the aid of the spring 381. The swinging lever 364 already mentioned is provided at the top with an extension on which a spring 383 is hooked and constitutes the power store for driving the elevating wheel shaft and hence the fare rollers or for the escapement 233.

The action is as follows:

FIGURE 15 shows the position of the swinging lever in full lines just at the moment in which the contacts 362 lie upon the contacts 357 of the coil armature. At the moment the coil receives current, the magnet armature is pulled suddenly into the coil until the right hand end of the coil armature meets the elastic disc 351 and thus absorbs the movement. On this longitudinal movement the swinging lever 364 is rocked to the right through a small angle by the contacts, the spring 383 being tensioned. When the coil armature strikes the elastic disc 351 it is stopped, while the swinging lever moves on by a small amount owing to its mass and any additional centrifugal weights. At this moment the coil current is again broken. The special advantages of this contact arrangement are that at the beginning of the contact closing a very powerful contact pressure is achieved with the aid of the spring 383 and this contact pressure is further augmented many times at the moment when the coil armature is pulled into the coil, since the total attraction force of the magnet now takes effect as contact pressure. Through the stopping of the coil armature 350 and the continued swing of the swinging lever 364, it is further achieved that the current is broken at the moment at which the coil armature and hence the swinging lever have attained the greatest speed, whereby an extremely rapid quenching of the spark is achieved and any arcing of the contacts obviated. Furthermore, through the frictional effect of the contacts during the elevating movement they continually clean themselves automatically and at the same time prevent the possibility of their sticking together. This is achieved by the fact that the contacts of the coil armature carry out a linear movement and the contacts of the swinging lever perform a circular movement. If the swinging lever has attained the right-hand position indicated by broken lines and if the contact is broken, then the spring 383 takes effect and drives the elevating wheel shaft through the pawl 373 and the fine-toothed ratchet wheel 369 through the intermediate spring 372 and the toothed wheel 370. In order that the lever 364 should not immediately fall back into its left-hand position, the wheel train with the escapement 233 is incorporated. The shorter the waiting-time unit set per fare shift, the more rapidly the swinging lever moves from its right-hand to its left-hand position. The fine toothed ratchet wheel 369 is connected to the toothed wheel 370 through an intermediate spring 372 in order that the escapement 233 may also be subjected to a driving force during movement into the coil of the armature. At the same time, this spring 372 constitutes a short motion reserve in the case of short current interruptions. On swinging of the swinging lever to the right, the retaining pawl 376 prevents backward rotation of the ratchet wheel 369, while this pawl slides over the ratchet teeth when the swinging lever moves slowly to the left.

*FIGURES 17, 18 and 19*

FIGURE 17 shows the vehicle adapting gear, which has already been mentioned in FIGURES 1, 2, 3 and 4. The object of this vehicle adapting gear is to match the speed of rotation of the gear connection of the vehicle (distance speed) to the apparatus constant of the taximeter. In addition, compensation can be made for differences in tyre diameters.

Attached directly to the taximeter casing 428 by screws 398, 399, 400, and a clamping plate 426 is a first housing member 418 and a second housing member 463.

The first housing member 418 has two branches 419, 420 in which are mounted a rotatable input or driving member 421 to which is connected the driving shaft 422 from the vehicle gearbox and an output element 423 which is connected to an output shaft 388 that leads to the tachometer. The axes of the rotary parts 421, 423 are at an angle of between 30 and 60 degrees to each other (e.g. 45°) and are geared together by bevel wheels 386, 387 mounted thereon respectively. The member 421 also carries a worm 384 which drives a worm wheel 385 on a spindle 404 that is rotatably mounted in a spigot 389 on the housing member 463. By this construction the housing member 418 can be adjusted rotatably about the axis of the worm wheel 385 so as to bring the shafts 422, 388 to the most convenient positions without disturbing the drive from worm 384 to the gear wheel 385. The housing member 418 can be locked in adjusted position by tightening the screws 398, 399, 400 and further held against removal by means of a pair of arms 393, 396 one of which carries a pin 395 that engages in one of a number of holes 394 in the other. The pin 395 also engages in a hole 434 in the housing member 463. The arm 396 has one end surrounding a cup 397 which will be sealed with lead according to police regulations. The arm 393 has one end engaging in a slot in a screw 392 so that the latter and associated parts cannot be removed without first removing the lead seal.

Moreover, the driving shaft cannot be removed nor can the housing member be pivotally moved.

The arrangement illustrated in FIGURE 17 shows the connecting branch 419 in a vertical position. If the connecting cable is required to be in another direction, for example horizontally to the rear or in an intermediate position, it is possible to position the branch 419 correspondingly by securing the lever 393 in the desired position in one of the bores 394 by the pin 395 of the cranked arm 396. The housing member 418 is then clamped fast by tightening the clamping screws. Since, generally, only the downward vertical position or the rearward horizontal position or between positions are required, no enlargement of this range is provided. A lead seal 401 prevents the removal of the cover plate 426 from the housing 463 and a lead seal 403 is provided as a data covering seal. If the seal 397 is mounted on another part of the taximeter, for example on the front, for better visibility, the cranked lever 396 must then have a suitably modified shape, the pin 395 retaining its former position however.

The spindle 404 carries at its end opposite to the worm wheel 385 a wheel 405 which can be replaced to provide a change of ratio (see FIGURE 19). The change wheel 405 is in mesh with an intermediate wheel set 406, and the latter is in mesh with a second replaceable wheel 407. Fine adjustment is effected by replacing the two wheels 405, 406, while coarse adjustment is effected by replacing the worm and worm wheels 384, 385. The intermediate wheel 406 is mounted on a shaft 408 and this is in turn mounted on an adjustable segment 409. If the change wheel 405 is changed, the intermediate wheel must also be changed with it, a constant tooth sum for the two wheels having to be maintained on changing. Adjustment of the engagement between the wheel 405 and the intermediate wheel 406 is thus avoided. According to the size of the toothed wheel 406, the setting segment 409 is turned until the intermediate wheel comes into engagement with the second change wheel 407. All three wheels 405, 406, 407 are wheels having a D-shaped bore located on correspondingly shaped part of the spindles on which they are mounted. Since the two shafts of wheels 405 and 407 can have disposed thereon wheels having any desired number of teeth, a very large number of combinations is possible, so that a very fine-stepped adjustment to the distance speed of vehicle is obtained in a simple manner.

The wheels 405, 406, 407 are all similar to each other and preferably also similar to the wheels of the time drive device of the taximeter. That is to say, the wheels are similar in the following respects:

(1) The tooth shape is the same and this is the modified involute shape in which the head of the tooth ($k$ in FIGURE 20) is slightly greater than the module ($m$), e.g. $k=m+0.2m$, which means that the axial distance between two wheels will have to be enlarged correspondingly. The pitch diameter $(P)=mt$, where $t=$the number of teeth. The head circle diameter of the wheels therefore increases by the amount of the enlargement of the tooth heads, i.e. by $2.(m+0.2m)$, which gives a formula $(H)=mt+2.1.2m$ for the diameter of the head circle. This results in a flank clearance S and a radial clearance R for the involute teeth, which are otherwise free from backlash.

(2) The internal periphery is the same, e.g. D-shape or other suitable shape for being fixed on their spindle against rotary motion with respect to their spindles.

By this means all, or practically all, the wheels in the taximeter may be selected from a small number of standard wheels and change of ratios in the various gear trains can be readily made.

The shaft 64 of wheel 407 carries a two armed pin 65 which engages a correspondingly shaped clutch member inside the taximeter, thereby transmitting the driving movement from the tachometer drive to the inside of the taximeter.

FIGURES 21 and 22

The taximeter is supplied with current through a fuse box, which is shown in FIGURES 21 and 22. The fuse box comprises a box-like block 513 which has three openings through which extend three plugs 502, 503 and 504. These plugs are plugged into three respective sockets in the side wall of the taximeter, thereby fixing the fuse box on the taximeter. These sockets are connected to the current leads inside the taximeter. Inside the fuse box these leads are fastened by screws to the contact members 505, 506, 507. The lead connected to plug 502 is earthed. The supply lead from the battery enters the fuse box by a lead 508 and is connected to a spring arm 509, so that the electric circuit is closed through a fuse 510, spring arm 514, and the plug 503 for the supply to the instrument, i.e. the electric drive for the clock. The plug 504 serves for supplying the roof sign with current. On top and on one side the fuse box is shut off by a sliding cover 511, which closely engages opposite side surfaces of the block 513 and has rounded guide margins 515, 516 which slidably engage ridges on the block.

The cover 511 is kept in position by a spring pressed button 512 mounted on the block 513. For the purpose of exchanging the fuse 510 the cover can be removed by pressing the button 512 and pulling the cover out sideways. As may be seen from the drawings the contact plugs 502, 503 and 504 are not arranged at equal intervals of each other which prevents insertion of the fuse box the wrong way.

I claim:

1. In a taximeter having fare indicating means and a shaft driving said fare indicating means according to distance and time, driving means for driving said shaft according to time, said driving means comprising spring means for impelling said shaft, a clock escapement device for controlling the movements of said shaft, movable means for tensioning said spring means, said movable means being a swinging lever and having a forked part at one end thereof, a first pair of electrical contacts carried by said forked part of said movable means, an actuating member for actuating said movable means arranged between said forked part of said movable means, a second pair of electrical contacts carried by said actuating member in operative position to said first pair of electrical contacts, said spring means urging said movable means and said first pair of contacts in the direction towards said second pair of electrical contacts on said actuating member stepwise under the control of said escapement means, electromagnetic means electrically connected with said first and second pair of contacts and with a source of electrical energy, said electromagnetic means when energized actuating said actuating member to press its second pair of contacts against said first pair of contacts on said movable member, thereby moving said movable means and tensioning said spring means, means for separating said first and second pair of contacts at the end of each working stroke of said actuating member and means for withdrawing said actuating member to its initial position after separation of said first and second pair of contacts.

2. In a taximeter as claimed in claim 1, wherein said electromagnetic means consists of two electromagnetic coils, which can be connected selectively in parallel and series according to the available voltage of said source of electric energy.

3. In a taximeter as claimed in claim 1, said movable means having a pawl, said pawl being in driving engagement with a gear wheel, another gear wheel fastened to said shaft and an intermediate spring, one end of which being fastened to said first gear wheel, the other end being fastened to the other gear wheel.

References Cited in the file of this patent

UNITED STATES PATENTS

| | | |
|---|---|---|
| 415,817 | Lane | Nov. 26, 1889 |
| 521,396 | Vidal | June 12, 1894 |
| 936,559 | Pearson | Oct. 12, 1909 |
| 1,136,164 | Ohmer et al. | Apr. 20, 1915 |
| 1,367,712 | Ohmer et al. | Feb. 8, 1921 |
| 1,448,815 | Reilly | Nov. 20, 1923 |
| 1,498,217 | Walker | June 17, 1924 |

(Other references on following page)

UNITED STATES PATENTS

| | | |
|---|---|---|
| 1,736,064 | Walker | Nov. 19, 1929 |
| 1,806,353 | Johnson | May 19, 1931 |
| 1,839,215 | Geisslinger | Jan. 5, 1932 |
| 1,914,215 | Price | June 13, 1933 |
| 1,954,890 | Rembert et al. | Apr. 17, 1934 |
| 2,009,601 | Anderson | July 30, 1935 |
| 2,040,500 | Sadgebury et al. | May 12, 1936 |
| 2,127,186 | Perkins | Aug. 16, 1938 |
| 2,315,569 | White | Apr. 6, 1943 |
| 2,332,381 | Hoelscher | Oct. 19, 1943 |
| 2,554,103 | Grip | May 22, 1951 |
| 2,596,164 | Palmer | May 13, 1952 |
| 2,641,411 | Bell | June 9, 1953 |
| 2,661,156 | Anderson | Dec. 1, 1953 |
| 2,742,797 | Perham | Apr. 24, 1956 |